(No Model.)
F. W. SEABURY.
METHOD OF VULCANIZING RUBBER.
No. 325,119. Patented Aug. 25, 1885.
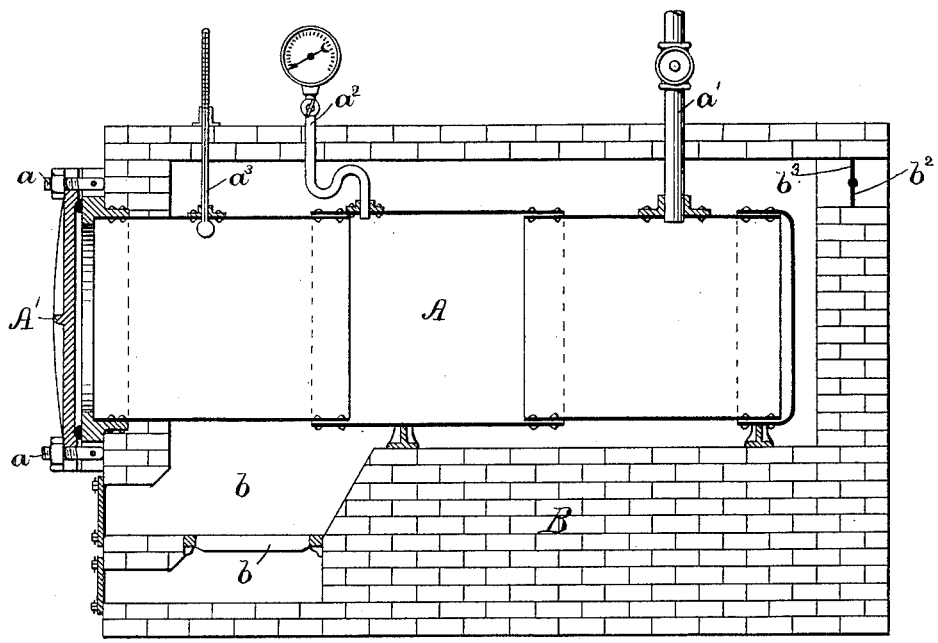
WITNESSES:
C. H. Luther Jr
Jno. L. Condon
INVENTOR:
Frederick W. Seabury
by Joseph A. Miller & Co
Attys

UNITED STATES PATENT OFFICE.

FREDERICK W. SEABURY, OF PROVIDENCE, RHODE ISLAND.

METHOD OF VULCANIZING RUBBER.

SPECIFICATION forming part of Letters Patent No. 325,119, dated August 25, 1885.

Application filed June 3, 1884. (No model.)

*To all whom it may concern:*

Be it known that I, FREDERICK W. SEABURY, of the city and county of Providence, and State of Rhode Island, have invented a new, useful, and Improved Method of Vulcanizing Rubber, of which the following is a full, clear, and exact description, reference being had to the accompanying drawing, forming a part of this specification.

My invention relates to the vulcanization of rubber for general purposes, and particularly for dental purposes; and the object of my invention is to produce a pure and compact article after vulcanization.

To the above purpose my invention consists in the improved method of vulcanization, as hereinafter described and claimed.

In order to produce the very best results from vulcanization it is essential that moisture be absolutely excluded from contact with the rubber undergoing vulcanization, otherwise the vulcanizing process will produce a spongy or porous article, which, by reason of its lack of compactness, is unfitted for general use and particularly for dental purposes.

My improved method consists in vulcanizing the rubber or rubber articles in a vulcanizing-chamber into which steam from a suitable generator is introduced; the said vulcanizer being provided with a furnace or other suitable means whereby the steam introduced from the generator is superheated. As the result of this method the rubber or rubber articles undergoing vulcanization are not affected by moisture resulting from the condensation of steam, and, consequently, are compact, pure, and in every way suitable for general purposes or for the purposes of dentistry.

The figure in the accompanying drawing illustrates, partly in side elevation and partly in section, an apparatus for carrying out my improved method.

In the said drawing, A designates a cylindrical chamber, which is placed horizontally in a brick-work casing, B. In the lower front portion of the casing B is a fire-chamber, $b$, containing a grate, $b'$, and at the upper rear portion of the casing B is a flue, $b^2$, containing a damper, $b^3$. The vulcanizing-chamber A is constructed after the fashion of a boiler-shell, and at its front end is provided with a removable gate, A', which is securely held against the open end of the chamber by the nuts and bolts $a$, a suitable packing being provided for the purpose of hermetically sealing the gate to the chamber.

$a'$ designates a valved-pipe, which conducts steam from a steam-generator to the interior of the vulcanizing-chamber A. $a^2$ designates a steam-gage. $a^3$ designates a thermometer. The said parts are placed in communication with the interior of the boiler.

A fire is started upon the grate $b'$ in the chamber $b$, and the degree of combustion is regulated by the damper $b^3$ in the flue $b^2$. The rubber or rubber articles to be vulcanized are placed in the chamber A, and steam from the generator is let into the chamber A through the pipe $a'$. The fire in the fire-chamber $b$ superheats the steam in the chamber A and prevents any condensation of steam therein, so that the rubber or rubber articles after vulcanization are compact, pure, and suitable for general purposes and also for dental purposes. The rubber is placed in the vulcanizing-chamber either in the mass or in molds, such latter being the case in dental and many other branches of vulcanization. In the event of the rubber being placed in the vulcanizing-chamber in molds, the latter are also subjected to the steam-pressure.

By means of the gage $a^2$ the required degree of pressure is indicated, and by means of the thermometer $a^3$ the temperature of the interior of the chamber A may be observed and the proper temperature maintained.

I do not wish to be understood as confining myself to the precise details of method hereinbefore described, as my invention contemplates various modifications whereby the steam in the vulcanizing-chamber is maintained at a temperature incident to its pressure or above the same, either by the use of fire-heat applied to the vulcanizer, or of hot air introduced into the vulcanizer, or by any other well-known means whereby the condensation of steam in the vulcanizer is prevented.

An important result of my improved method is that a constant circulation of the steam in the chamber A is produced, so that the steam acts uniformly upon all of the molds, or upon the entire mass of rubber in the vulcanizer, and hence prevents the burning of the molds or of the mass of rubber.

Having thus described my invention, I claim as new and desire to secure by Letters Patent—

5. The improved method herein described of vulcanizing rubber, the same consisting in subjecting the rubber to the action of steam under pressure and dry heat in a vulcanizing-chamber, as described.

FREDERICK W. SEABURY.

Witnesses:
J. A. MILLER, Jr.,
M. F. BLIGH.